(12) United States Patent
Yoshio et al.

(10) Patent No.: US 8,886,634 B2
(45) Date of Patent: Nov. 11, 2014

(54) APPARATUS FOR DISPLAYING RESULT OF ANALOGOUS IMAGE RETRIEVAL AND METHOD FOR DISPLAYING RESULT OF ANALOGOUS IMAGE RETRIEVAL

(75) Inventors: Hiroaki Yoshio, Kanagawa (JP); Katsuji Aoki, Kanagawa (JP)

(73) Assignee: Panasonic Corporation, Osaka (JP)

( * ) Notice: Subject to any disclaimer, the term of this patent is extended or adjusted under 35 U.S.C. 154(b) by 296 days.

(21) Appl. No.: 12/672,387

(22) PCT Filed: Apr. 21, 2009

(86) PCT No.: PCT/JP2009/001824
§ 371 (c)(1),
(2), (4) Date: Feb. 5, 2010

(87) PCT Pub. No.: WO2009/133667
PCT Pub. Date: Nov. 5, 2009

(65) Prior Publication Data
US 2011/0087677 A1 Apr. 14, 2011

(30) Foreign Application Priority Data

Apr. 30, 2008 (JP) ............................... P2008-118690

(51) Int. Cl.
*G06F 17/30* (2006.01)
*G06F 7/00* (2006.01)
*H04N 5/76* (2006.01)
*G08B 13/196* (2006.01)

(52) U.S. Cl.
CPC ............ *H04N 5/76* (2013.01); *G08B 13/19613* (2013.01); *G06F 17/30793* (2013.01)
USPC ........... 707/722; 707/737; 707/749; 707/758; 382/115; 382/118; 382/224; 382/305

(58) Field of Classification Search
CPC .................... G06F 17/30244; G06F 17/30247; G06F 17/30781; G06F 17/30793
USPC .......... 707/722, 737, 749, 758; 382/115, 118, 382/224, 305
See application file for complete search history.

(56) References Cited

U.S. PATENT DOCUMENTS 7,639,877 B2 * 12/2009 Shiota et al. .................. 382/190
2006/0056737 A1 3/2006 Ohtsuka
(Continued)

FOREIGN PATENT DOCUMENTS

| JP | 2002-183205 A | 6/2002 |
|---|---|---|
| JP | 2005-049968 A | 2/2005 |

(Continued)

OTHER PUBLICATIONS

International Search Report for PCT/JP2009/001824.

*Primary Examiner* — Alicia Lewis
(74) *Attorney, Agent, or Firm* — Pearne & Gordon LLP

(57) ABSTRACT

A challenge to be met is to make it possible to accurately ascertain a behavior history of a person in various camera environments. Person characteristic data extracted from a plurality of cameras are stored in a person characteristic database. A retrieval request receiving section receives an identifier for identifying a person to be retrieved as a retrieval key. A characteristic retrieval section performs retrieval of persons matching the retrieval key from the person characteristic database in descending order of similarity. A retrieval result grouping section classifies the results of retrieval into units assumed to belong to the same environment. A retrieval result display section displays results of grouping. Since retrieval results are displayed in the form of a list on each unit assumed to belong to the same environment, the person to be retrieved can simply be ascertained in various camera environments despite a limited number of displays provided.

12 Claims, 10 Drawing Sheets

(56) References Cited

U.S. PATENT DOCUMENTS

| | | |
|---|---|---|
| 2007/0077025 A1 | 4/2007 | Mino |
| 2007/0143272 A1* | 6/2007 | Kobayashi ................... 707/3 |
| 2007/0189585 A1* | 8/2007 | Sukegawa et al. ............ 382/118 |
| 2008/0037878 A1 | 2/2008 | Katta |
| 2009/0254537 A1 | 10/2009 | Yoshio et al. |
| 2012/0189214 A1* | 7/2012 | Matsushita et al. ........... 382/224 |

FOREIGN PATENT DOCUMENTS

| | | |
|---|---|---|
| JP | 2006-79461 A | 3/2006 |
| JP | 2007-114897 A | 5/2007 |
| JP | 2007-122694 A | 5/2007 |
| JP | 2007-158421 A | 6/2007 |
| JP | 2007-172384 A | 7/2007 |
| WO | 2007/063970 A1 | 6/2007 |

* cited by examiner

<GROUPING HISTORY INFORMATION>

RETRIEVAL OF MR. B (IN THE PAST)   GROUP 1: CAMERA 1, CAMERA 2
                                   GROUP 2: CAMERA 5, CAMERA 7

RETRIEVAL OF MR. C (IN THE PAST)   GROUP 1: CAMERA 1, CAMERA 3
                                   GROUP 2: CAMERA 5, CAMERA 7

DURING RETRIEVAL OF MR. A, CAMERA 5 AND CAMERA 7 ARE GROUPED
EVEN WHEN DIFFERENCE EXISTS BETWEEN CLASSIFICATION EVALUATION
VALUES OF CAMERA 5 AND CAMERA 7

APPARATUS FOR DISPLAYING RESULT OF ANALOGOUS IMAGE RETRIEVAL AND METHOD FOR DISPLAYING RESULT OF ANALOGOUS IMAGE RETRIEVAL

TECHNICAL FIELD

The present invention relates to an apparatus for displaying a result of analogous image retrieval and a method for displaying the result of analogous image retrieval for the purpose of efficiently retrieving an image analogous to a specific person (retrieval of a behavior history) from person characteristic data (a face, a color, a figure, and the like) extracted from a plurality of camera images.

BACKGROUND ART

In recent years, proliferation of a video surveillance system for which cameras, sensors, a storage device, and the like, are installed to prevent occurrence of crimes is significantly proceeding in step with an increase in the number of crimes typified by lock-picking crimes, assailing thieves, arson, and the like. The number of systems that conduct wide-area surveillance of a size of hundreds areas and long-hour recording is also increasing in conjunction with proliferation of IP-based surveillance cameras and a leap in capacity of a storage device. Under such circumstances, a technique for efficiently rooting out a specific person, such as a shoplifter, a stray child, a person who lost property, and the like, has been sought with the aim of lightening a workload for a surveyor.

A related-art technique for rooting out a specific person (a person to be retrieved) at high speed is to store in a database characteristic data (a face, a color, a figure, and the like) pertaining to an indefinite number of persons extracted from respective camera images and to extract from the database a person matching characteristic data on a person to be retrieved and display the extracted person. Patent Document 1 discloses a method for re-performing retrieval operation by making a change to "a countenance, an age, a gender, and the like" on a retrieval screen when a desired person cannot be acquired.

RELATED-ART DOCUMENT

Patent Document

Patent Document 1: JP-A-2002-183205

DISCLOSURE OF THE INVENTION

Problem that the Invention is to Solve

However, under the related-art technique, fluctuations arise in a propensity of person characteristic data depending on imaging conditions (illumination, an angle of view, and the position/size of a person). For these reasons, a threshold for matching (a value of a boundary between a target/a non-target) must be controlled at the time of retrieval operation in consideration of imaging conditions of respective cameras, which raises a problem of consumption of much time before acquisition of a desired result. For instance, as shown in FIG. 10, three persons A to C appear in imaging environments of cameras 1 through 3, and characteristic data pertaining to the respective persons are mapped in a person characteristic space. Even when retrieval is conducted in connection with an image close to the person A of the camera 3, a phenomenon of the person B of the camera 3 causing a hit before the person A of the camera 1 occurs, and the user must perform retrieval operation involving an approval of occurrence of a faulty retrieval, which raises a problem of extreme inefficiency.

The present invention has been conceived in view of the circumstance and aims at providing an analogous image retrieval result display apparatus and a method for displaying a result of an analogous image retrieval that make it possible to simply, accurately ascertain a behavior history of a person to be retrieved in various camera environments.

Means for Solving the Problem

An apparatus for displaying a result of analogous image retrieval, comprises: a person characteristic database that stores person characteristic data extracted from a plurality of cameras; a retrieval request receiving section that receives as a retrieval key an identifier for identifying a person to be retrieved; a characteristic retrieval section that retrieves a person matching the retrieval key received by the retrieval request receiving section from the person characteristic database in descending order of similarity; a retrieval result grouping section that reclassifies a list including a result of retrieval performed by the characteristic retrieval section into units, each of the units is estimated to belong to same environment; and a retrieval result display section that displays a grouped result performed by the retrieval result grouping section.

By means of the configuration, since retrieval results are displayed in the form of a list on each unit assumed to belong to the same environment as mentioned above, a person to be retrieved can simply be ascertained in various camera environments despite a limited number of displays provided. In particular, a possibility of a failure to display results of cameras exhibiting low similarity levels can be reduced. Therefore, it is possible to simply, accurately switch retrieval conditions including designating results of low similarity levels pertaining to the person to be retrieved as images for the next retrieval and performing detailed retrieval (extraction of all persons to be retrieved) focused primarily on an imaging environment differing from that of the first retrieval images.

In the above configuration, the characteristic retrieval section retrieves the person from the person characteristic database in the descending order of the similarity on a per-camera basis and combines the retrieval results of the respective cameras to generate a retrieval result.

By means of the configuration, a result belonging to a camera exhibiting low similarity inevitably belongs to any group, and hence a phenomenon of no hit of a result being found in a specific camera can be eliminated.

In the above configuration, the retrieval result grouping section divides the retrieval result on a per-location basis, and estimates locations belonging to the same environment based on a mean-dispersion value of retrieval ranks/scores acquired on the per-location basis. In addition, the same environment is estimated by use of "information about an orientation of a person," "information about the size of a person," "information about contrast density pattern of a person," "information about sensitivity achieved at the time of detection of a person," or "date and time information" included in retrieval results.

By means of the configuration, the same environment including conditions for installing cameras (an angle of view/height) and illumination conditions (the orientation/intensity of a light source) can be estimated, so that accuracy in grouping retrieval result can be enhanced.

In the configuration, the retrieval result display section selects typical results on a per-group basis and displays a list of the selected typical results.

By means of the configuration, it is possible to concurrently provide a function of listing persons to be retrieved in various camera environments and a function of ascertaining the history of all behaviors of the persons to be retrieved. In particular, as a result of adoption of a display mode for providing a detailed display of results exhibiting high similarity levels and displaying typical results in connection with results exhibiting low similarity levels, a searcher can fulfill retrieval of a history of all behaviors in various camera environments by means of simple switching operation including ascertaining the history of all behaviors from results of high similarity levels and designating and re-retrieving results of low similarity levels, including the person to be retrieved, as conditions for the next retrieval at a point in time when similarity levels are deteriorated (a point in time when other persons are mixedly captured); namely, performing detailed retrieval focused primarily on the imaging environments whose similarity levels are deteriorated.

A method for displaying a result of analogous image retrieval, comprises: a person characteristic data storage step of storing person characteristic data extracted from a plurality of cameras into a person characteristic database; a retrieval request receiving step of receiving as a retrieval key an identifier for identifying a person to be retrieved; a characteristic retrieval step of retrieving a person matching the retrieval key received in the retrieval request receiving step from the person characteristic database in descending order of similarity; a retrieval result grouping step of reclassifying a list including a result of retrieval performed in the characteristic retrieval step into units, each of the units is estimated to belong to same environment; and a retrieval result display step of displaying a result of the grouping performed in the retrieval result grouping step.

By means of the method, since retrieval results are displayed in the form of a list on each unit assumed to belong to the same environment as mentioned above, a person to be retrieved can simply be ascertained in various camera environments despite a limited number of displays provided. In particular, a possibility of a failure to display results of cameras exhibiting low similarity levels can be reduced. Therefore, it is possible to simply, accurately switch retrieval conditions including designating results of low similarity levels pertaining to the person to be retrieved as images for the next retrieval and performing detailed retrieval (extraction of all persons to be retrieved) focused primarily on an imaging environment differing from that of the first retrieval images.

Advantage of the Invention

The present invention makes it possible to provide an analogous image retrieval result display apparatus and a method for displaying a result of retrieval of an analogous image that yield an advantage of the ability to simply, accurately ascertain a behavior history of a person to be retrieved in various camera environments.

BEST MODES FOR IMPLEMENTING THE INVENTION

Preferred embodiments for implementing the present invention are hereunder described in detail by reference to the drawings.

First Embodiment

Figure 1:
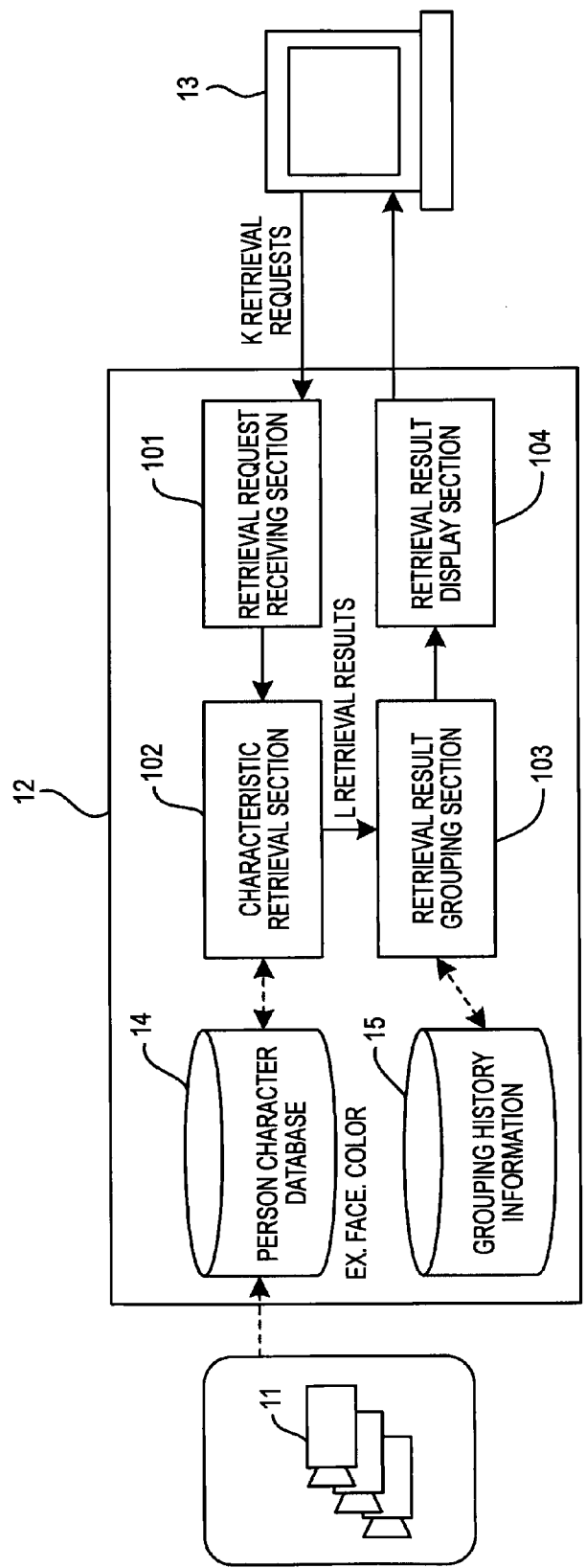
FIG. 1 It is a block diagram showing a general configuration of an analogous image retrieval result display apparatus of a first embodiment of the present invention.

FIG. 1 is a block diagram showing a general configuration of an analogous image retrieval result display apparatus of a first embodiment of the present invention. In FIG. 1, an analogous image retrieval result display apparatus of the present embodiment has a plurality of cameras 11 for detecting persons; a person retrieval server 12 for retrieving a person matching designated retrieval conditions; and a retrieval terminal 13 that performs retrieval operation by designating retrieval conditions for the person retrieval server 12.

The person retrieval server 12 has a person characteristic database 14 for storing characteristic data (a face, a color, a figure, and the like) pertaining to a person detected by the plurality of cameras 11; a retrieval request receiving section 101 that receives at least an identifier for identifying a person to be retrieved as a retrieval key; a characteristic retrieval section 102 that retrieves a person corresponding to a retrieval key received by the retrieval request receiving section 101 from the person characteristic database 14 in descending order of similarity; a retrieval result grouping section 103 that again groups a result of retrieval (a list of a retrieval sequence/similarity/a date and time/a location, and the like) performed by the characteristic retrieval section 102 into units estimated as belonging to the same environment; and a retrieval result display section 104 that displays a result of grouping performed by the retrieval result grouping section 103.

Person characteristic data extracted by the respective cameras 11 correspond to image data pertaining to a movable body clipped from images; information for pinpointing a movable body by means of a figure, a color, a size, and a motion; or information pinpointing shapes and positions of eyes, a nose, and a mouth of a face. A method for extracting and classifying these pieces of characteristic information has widely been known and is strictly described in; for instance, "Processing and Recognition of an Image" (cowritten by Takeshi AGUI, Tomoharu NAGAO, SHOKODO Co., Ltd.). Use of the existing technique makes it possible to pinpoint a person from camera images and extract characteristics of a face, clothing, colors, and the like, from the images. Although explanations are provided in connection with a configuration for extracting person characteristic data by means of the cameras 11, there may also be adopted a configuration for extracting person characteristic data by means of a recorder that stores and re-distributes a plurality of camera images, and the like.

Figure 2:
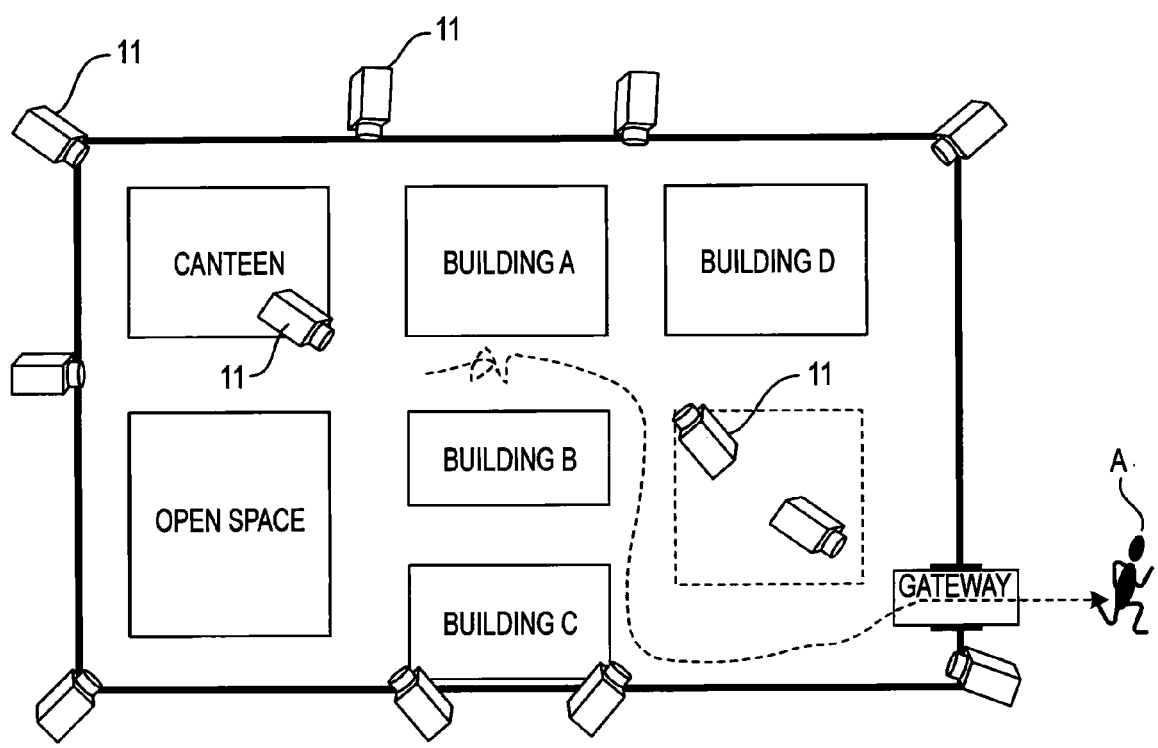
FIG. 2 It is a view showing a layout and image of utilization of cameras in the analogous image retrieval result display apparatus of the first embodiment of the present invention.

FIG. 2 illustrates an example layout of the plurality of cameras 11 installed in a premise, such as a factory, a shopping mall, and the like. When a person passes by the front of any of the cameras 11, characteristic data pertaining to that person (a face, a color, a figure, and the like) are detected, and the thus-detected data are stored in the person characteristic database 14 of the person characteristic server 12 at all times. When a security guard has sighted a runaway like the person A, the security guard conducts retrieval of data from the person retrieval server 12, thereby ascertaining a history of behaviors of the past with regard to the person A. In relation to the example shown in FIG. 2, since a result of retrieval shows that the person conducted a deviant behavior in the neighborhood of a building A, the security guard checks in detail whether or not there are unusual events around the building A. It is possible to early find an anomaly by use of the present system as mentioned above. Although explanations are provided by reference to the example for identifying a cause from the "runaway," the present system can be applied to ascertain a location of a stray child (or persons contacted a child in the past), whether or not there is another suspicious person in the premise, and the like.

Figure 3:
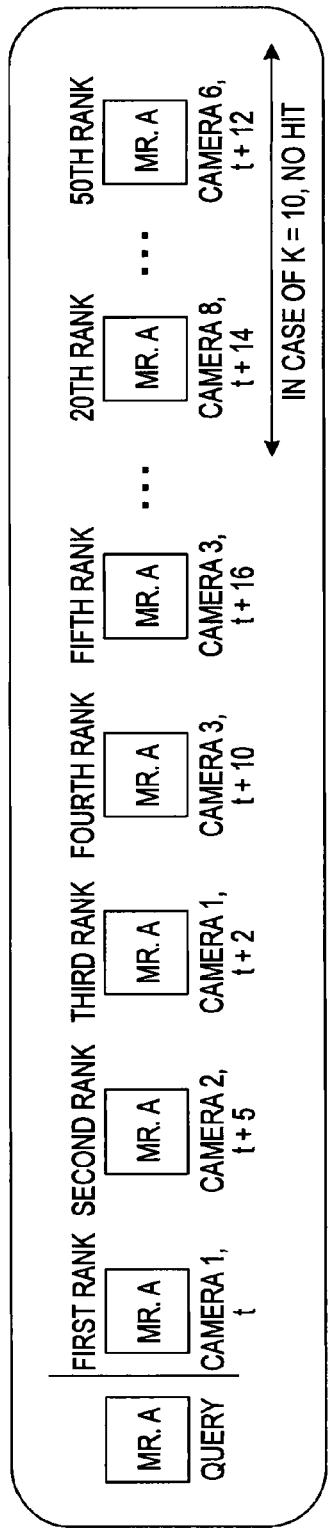
FIG. 3 It is a descriptive view of processing of a characteristic retrieval section in the analogous image retrieval result display apparatus of the first embodiment of the present invention.
Figure 3:
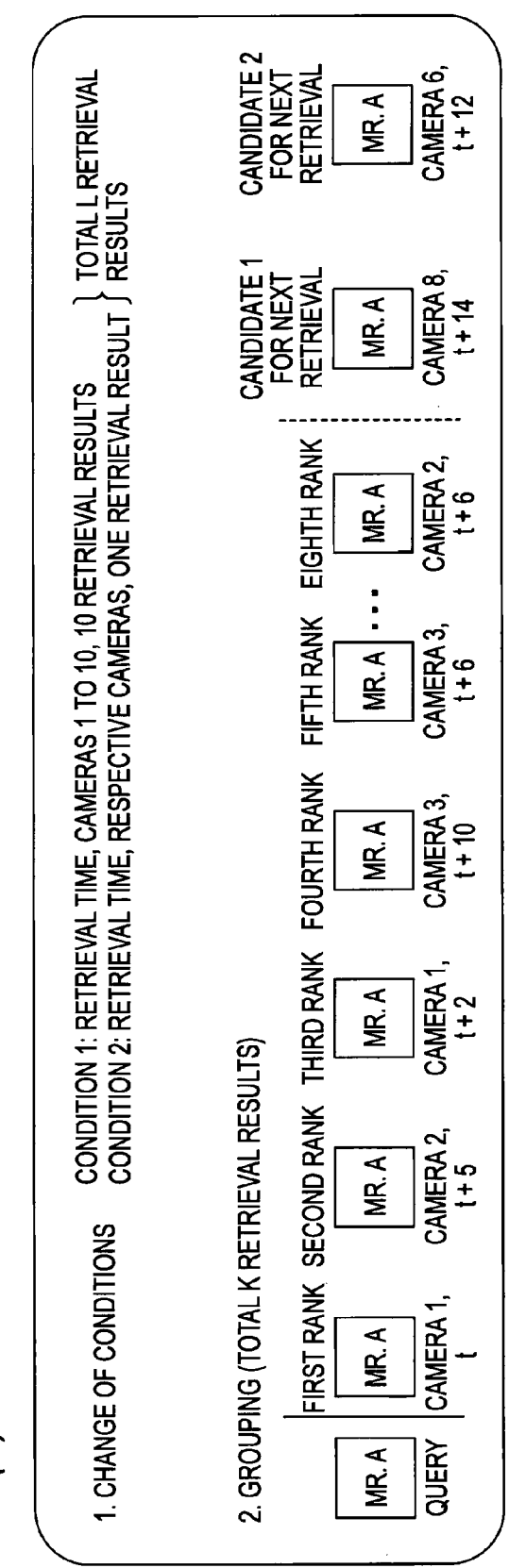

FIG. 3 is an image of retrieval operation in the characteristic retrieval section 102. In general characteristic retrieval, retrieval conditions, such as "a date and time/location" and "a face to be retrieved," and the number of retrieval results (K: an integer) are designated by way of the retrieval terminal 13, whereby K persons matching the retrieval conditions are fetched "in sequence of person similarity" from all sets of person characteristic data stored in the person characteristic database 14. Therefore, as shown in FIG. 3<*a*>, even when top ten persons are retrieved while the person A is taken as the retrieval conditions (query), there is a potential of results other than the person A being fetched. A result showing the person A who ranks number 20 or 50 cannot immediately be fetched. Meanwhile, as shown in FIG. 3<*b*>, the present invention is a method for changing the designated number of retrieval results (K) to a larger number of results (L); conducting retrieval of characteristics from the person characteristic database 14; and subjecting the thus-acquired L results to grouping in the retrieval result grouping section 103, thereby determining top K results. Hence, it is possible to prevent occurrence of a phenomenon of a failure to find a hit of result from a specific camera. A method for changing the number of retrieval results to number L and a method for grouping retrieval results are described later.

Figure 4:
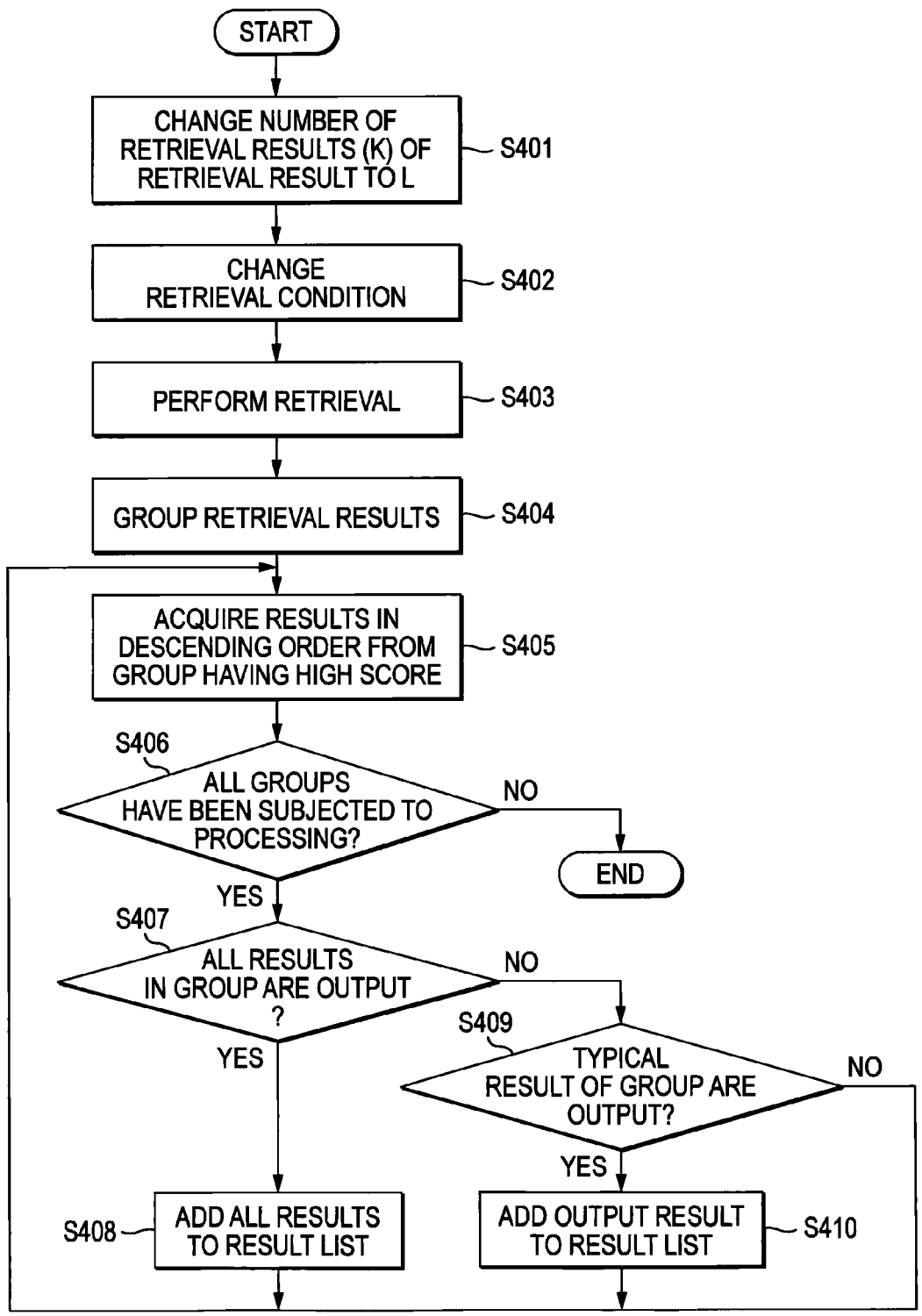
FIG. 4 It is a flow chart showing processing of the analogous image retrieval result display apparatus of the first embodiment of the present invention.

FIG. 4 shows processing procedures of the characteristic retrieval section 102, the retrieval result grouping section 103, and the retrieval result display section 104, and operations of these sections are now described. In the following descriptions about operations, the respective cameras 11 are referred to by means of camera numbers. For instance, a first camera 11 is called a camera 1; a second camera 11 is called a camera 2; a third camera 11 is called a camera 3; . . . .

<Step S401> The characteristic retrieval section 102 changes the number of retrieval results (K) designated by the retrieval request to number L. A value of L is determined by means of a method for simply using an integral multiple of K or a method for determining "L=(K×integer 1)+(Total Cam Num×integer 2)" from the number of camera numbers (Total Cam Num) showing locations request to be retrieved. The former technique is to acquire top L results, in sequence of similarity, from all cameras designated by a retrieval request and group the thus-acquired L results, thereby determining final top K results. The technique yields an advantage of consumption of a short retrieval execution time. In the meantime, the latter technique involves performing "processing for effecting retrieval of data in sequence of similarity from all of the cameras designated by a retrieval request" and "processing for effecting retrieval of data in descending order of similarity on a per-camera basis" and grouping acquired retrieval results, to thus finally determine top K results. The technique yields an advantage of the ability to inevitably acquire a result belonging to a camera exhibiting low similarity (the ability to prevent occurrence of a phenomenon of no hit of a result being found in a result of a specific camera).

<Step S402> The characteristic retrieval section 102 changes retrieval conditions. Specifically, the retrieval conditions; namely, the number of retrieval results to be acquired, are changed to L by means of the former method described in connection with step S401. The retrieval conditions are changed to new conditions ("a location=all designated cameras, the number of retrieval results=(K×integer 1)" or "a location="the designated camera 1, the number of retrieval results=(integer 2)" or "a location=the designated camera 2, the number of retrieval results=(integer 2)" . . . ) by means of the latter method.

<Step S403> The characteristic retrieval section 102 performs retrieval of similarities from the person characteristic database 14 on the retrieval conditions set in step S402, to thus acquire L retrieval results. When retrieval is conducted by means of the latter method described in connection with step S401, results acquired in connection with all of the cameras may overlap results acquired in connection with the respective cameras. Therefore, the number of retrieval results do not always equal to L.

<Step S404> The retrieval result grouping section 103 again groups the retrieval results L acquired in step S403 into units estimated to belong to the same environment, thereby creating a plurality of groups. Since each of the retrieval results includes information about "a retrieval rank/similarity/date and time/location, and the like," procedures 1 through 3 provided below are used as a method for grouping retrieval results into units, each of the units is estimated to belong to the same environment.

(Procedure 1) Retrieval results are divided on a per-camera basis, thereby calculating a "retrieval result count," a "means/dispersion of a retrieval rank," and a "means/dispersion of similarity" on a per-camera basis.

(Procedure 2) A classification evaluation value (Ev) is calculated for each camera by use of Equation 1. Although Equation 1 uses a retrieval rank, similarity can also be used.

$$Ev = w1 \times \text{a retrieval result count} + w2 \times \text{a mean rank} + w3 \times \text{a dispersion of a rank } [w: \text{a weighting coefficient}]. \quad [\text{Eq. 1}]$$

Figure 5:
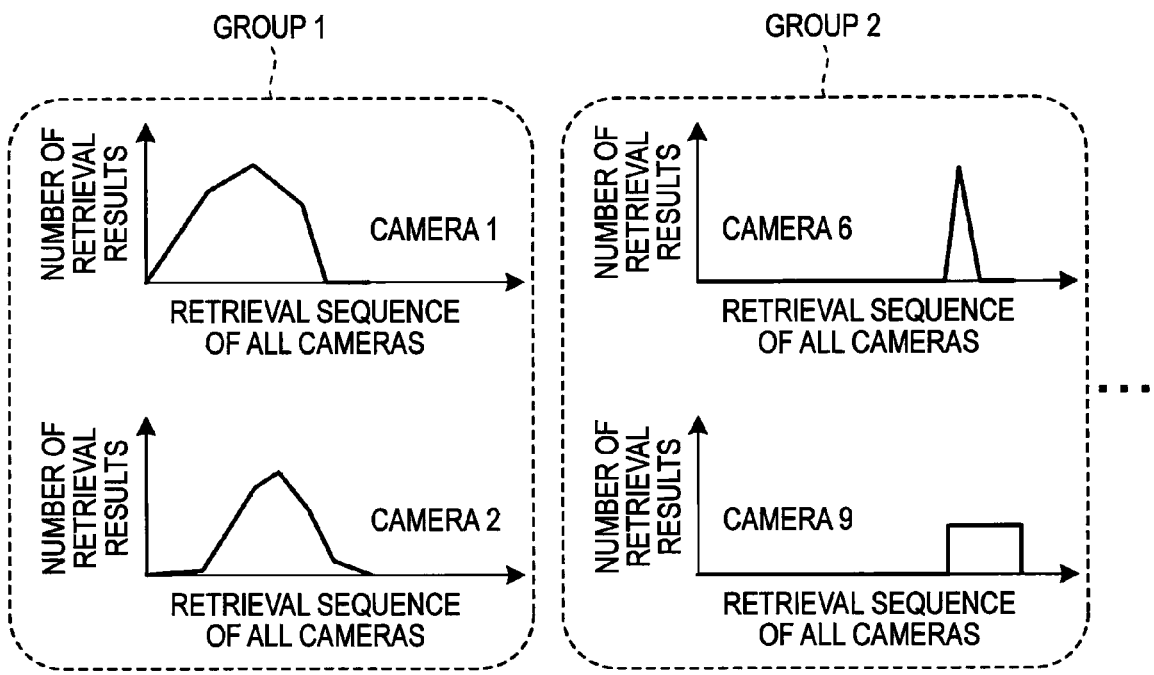
FIG. 5 It is a view showing an image of processing of a retrieval result grouping section in the analogous image retrieval result display apparatus of the first embodiment of the present invention.

(Procedure 3) Ev values of the respective cameras are compared with each other, and the cameras exhibiting similar Ev values are classified into the same group. For instance, as shown in FIG. 5, when retrieval results of respective cameras are plotted as a graph by means of a "horizontal axis: a retrieval rank in all cameras designated by a retrieval request" and a "vertical axis: the number of hits found in a given margin of ranks," Ev values of the camera 1 and the camera 2 become similar to each other and are classified into a group 1, and a camera 6 and a camera 9 are classified into a group 2. The latter method described in connection with step S401 requires performance of retrieval in descending order of similarity on a per-camera basis. In this case, since a retrieval rank in all of the cameras cannot be acquired, the classification evaluation value (Ev) is calculated by use of similarity rather than a retrieval rank.

<Step S405> The retrieval result display section 104 sequentially acquires retrieval results from groups exhibiting higher similarity levels.

<Step S406> The retrieval result display section 104 checks whether or not all of the groups are subjected to processing pertaining to steps S407 to S410. When all of the groups have undergone processing, processing ends.

<Step S407> The retrieval result display section 104 checks whether to output all retrieval results acquired from the groups in step S405. A check is made according to whether or not similarity of all of the retrieval results acquired from the groups is equal to or greater than a threshold value or whether or not a finally-output retrieval result satisfies (K−α) [α=the number of typical results (an integer)].

<Step S408> When the retrieval results are determined to be equal to or greater than the threshold value or less than (K−α) in step S407, the retrieval result display section 104 registers all results of the current groups into a final result list, and processing returns to step S405.

<Step S409> When not all of the retrieval results are determined to be output in step S407, the retrieval result display section 104 checks whether to output typical results of the group. A check is made according to whether or not the number of typical results to be finally output is less than α. When the number is α or more, processing returns to step S406.

<Step S410> When typical results are determined to be output in step S409, the retrieval result display section 104 registers typical results of a group into a final result list, and processing returns to step S405. There is a method for taking typical results of a group as results exhibiting a high similarity level in a group or as retrieval results of a camera not registered in a final result list.

As mentioned above, the retrieval results are displayed while grouped into units assumed to belong to the same environment, whereby persons to be retrieved in various camera environments can readily be ascertained despite a limited number of results displayed. In particular, results of cameras exhibiting low similarity levels inevitably belong to any groups, and hence occurrence of a phenomenon of no hit of results of specific cameras being found can be eliminated. In relation to a group exhibiting a high similarity level, all retrieval results are displayed. On the contrary, in relation to a group exhibiting a low similarity level, typical results are displayed. A searcher can readily, accurately perform switching of retrieval conditions; namely, designating results of a group exhibiting a low similarity level as next retrieval images and performing detailed retrieval (extraction of all persons to be retrieved) primarily in connection with an imaging environment differing from the first retrieval images.

Second Embodiment

A second embodiment of the present invention refers to an analogous image retrieval result display apparatus that enables enhancement of accuracy in grouping retrieval results into units assumed to belong to the same environment. The configuration referred to in connection with the second embodiment is substantially identical with that described in connection with the first embodiment. Therefore, descriptions are given solely to processing of the retrieval result grouping section 103, and repeated explanations of the other sections are omitted here for brevity.

Figure 6:
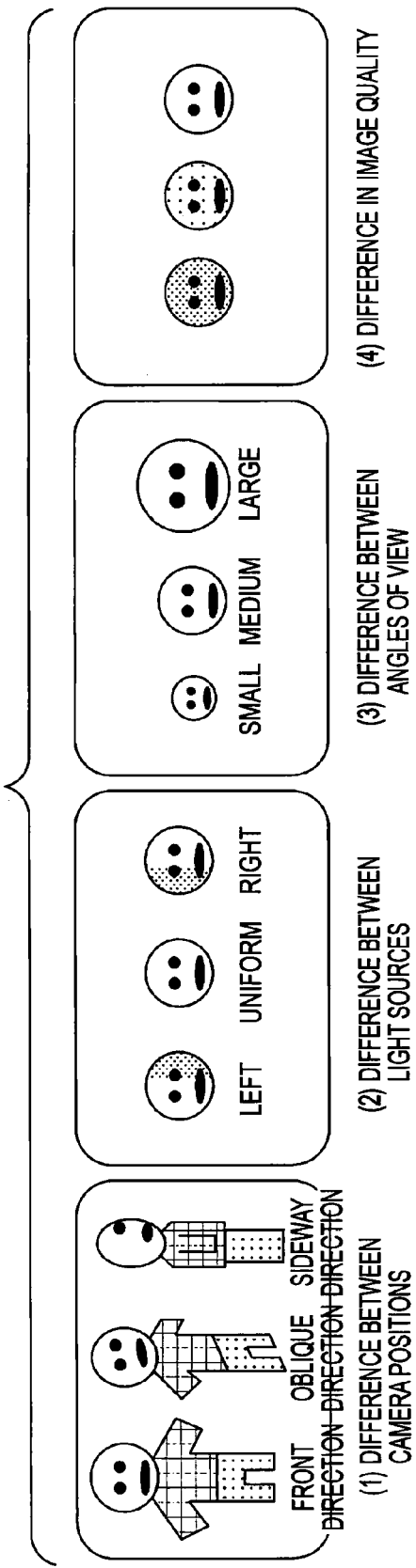
FIG. 6 It is a descriptive view of grouping operation taking into account imaging conditions and illumination conditions of the retrieval result grouping section in an analogous image retrieval result display apparatus of a second embodiment of the present invention.
Figure 6:
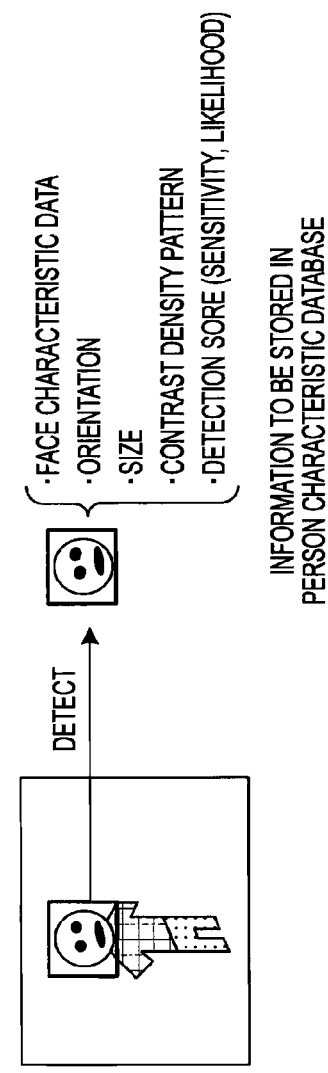

FIG. 6 shows a method for estimating the same environment including conditions for installing a camera (an angle of view/a height) and illumination conditions (the orientation/intensity of the light source). Retrieval results acquired by the characteristic retrieval section 102 sometimes differ from each other despite their similarity in terms of the orientation and size of a person and illumination conditions. In the phenomenon, even when two cameras, which are installed on different conditions and given different illumination conditions, are prepared to capture a plurality of persons, the two cameras do not exhibit the same similarity in connection with all of the persons. The same similarity is achieved in a specific time slot and in connection with a specific person. The phenomenon becomes a factor for deteriorating the accuracy of estimation in the same environment in the present invention.

FIG. 6<a> shows an exemplification in which different imaging conditions are given to the cameras. Patterns involving different imaging conditions include (1) positions where cameras are installed [angles at which persons are imaged (a front direction, an oblique direction, a sideway direction, and the like)], (2) differences between light sources (a uniform light source, a light source positioned beside a person, and the like), (3) differences between view angles of cameras (differences in zoom ratio), and (4) differences in imaging quality (differences attributable to lenses and signal processing, and the like).

As shown in FIG. 6<b>, the pieces of information (1) to (4) can be output at the time of detection of a person as [1] information about an orientation of a person (which can be generated by use of estimation of a face orientation or a walking direction), [2] information about contrast density pattern of a portrait (which can be generated by use of changes in brightness), [3] a detection size, and [4] Information about a likelihood of a person (that can be generated from an evaluation value by means of which a retrieval target has been determined to be a person) along with a thumbnail-size image of a person and person characteristic data. Accordingly, in addition to the "retrieval rank/similarity/date and time/location," the pieces of information [1] to [4] can be imparted to the respective retrieval results acquired by the characteristic retrieval section 102. Therefore, classification evaluation values (Ev values) acquired by means of retrieval result grouping processing (step S404) of the retrieval result grouping section 103 can be calculated with an incorporation of the indices [1] to [4]. Calculation of the Ev values is performed by means of a method for performing additional calculation with an addition of a weighting to the respective values of [1] to [4] and a method for roughly classifying respective cameras according to the values of [1] to [4] (setting a basic value Ev) and adding the value determined by (Eq. 1) to a basic Ev value of each of the thus-roughly-classified cameras. As mentioned above, the same environment, including the conditions for installing cameras (an angle of view/height) and illumination conditions (the orientation/intensity of a light source), is estimated, whereby the accuracy in groping retrieval results can be enhanced.

Figure 7:
FIG. 7 It is a descriptive view about grouping of retrieval results using groping history information in the analogous image retrieval result display apparatus of the second embodiment of the present invention.

Another method for enhancing the accuracy in estimating the same environment is now described. The retrieval result grouping section 103 shown in FIG. 1 has a function of storing results grouped in the past in the form of grouping history information 15. During processing for estimating the same environment, the grouping history information 15 is also used. FIG. 7 diagrammatically illustrates an example utilization of the grouping history information 15. When the frequency of the camera 5 and the camera 7 being grouped in the past is high, the camera 5 and the camera 7 are classified into the same group during current grouping operation even when a difference exists between the camera 5 and the camera 7 in terms of a classification evaluation value (Ev), whereby grouping involving elimination of a factor of deteriorating the accuracy of estimation of the same environment (a variation in the number of retrieval results for each camera, or the like) can be implemented. Another method for enhancing accuracy in estimating the same environment is to calculate a classification evaluation value (Ev) on a per-location basis (on a per-camera basis). However, each of the cameras is divided into a plurality of time slots, and an Ev is calculated for each of the thus-split time slots. By means of the method, even when a camera whose sunshine condition varies according to; for instance, a morning, a daytime, and a night time, is taken as a target, the accuracy of estimating the same environment can be maintained.

As mentioned above, the retrieval result grouping section 103 estimates the same environment by use of the "information about the orientation of a person," the "information about a contrast density pattern of a portrait," the "information about the size of a person (a detection size)," the "information about a likelihood of a person," the "past grouping information," or the "date-and-time information," whereby the same environment, including conditions for installing cameras (an angle of view/height) and illumination conditions (the direction/intensity of a light source), can be estimated, so that accuracy in grouping retrieval results can be enhanced.

Third Embodiment

A third embodiment of the present invention refers to a retrieval screen having a function for listing persons to be retrieved in various camera environments and a function for grasping a history of all behaviors of the person to be retrieved. Since a configuration described in connection with the third embodiment is substantially identical with that described in connection with the first embodiment, descriptions are provided solely to the retrieval result display section 104 and retrieval operation of the user, and repeated explanations of the other sections are omitted here for brevity.

Figure 8:
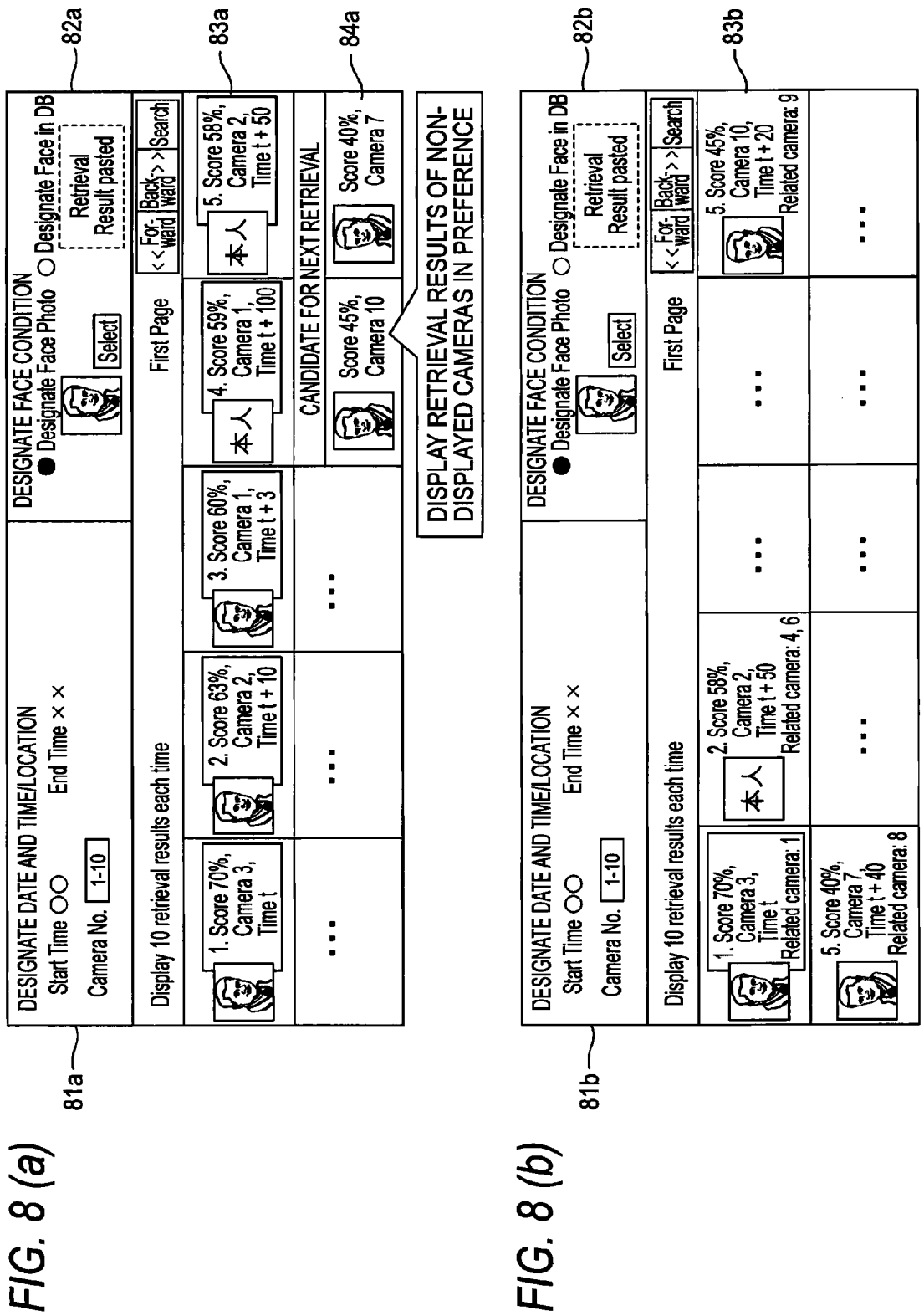
FIG. 8 It is a descriptive view about a retrieval display screen of an analogous image retrieval result display apparatus of a third embodiment of the present invention.

FIG. 8<*a*> and FIG. 8<*b*> show example retrieval screens of the user. Reference symbols 81*a* and 81*b* designate screens for setting a date and time and a location of retrieval conditions; 82*a* and 82*b* designate screens for setting a face image (can be designated also as a color image) of the retrieval conditions; 83*a* designates a retrieval result display screen for displaying persons analogous to a face image designated by the screen 82*a* in sequence of similarity; 84*a* designates a screen for displaying typical images of groups exhibiting low similarity levels as candidates for the next retrieval; and 83*b* designates a screen for grouping retrieval results and listing typical images on a per-group basis. In relation to the face image setting screens 82*a* and 82*b*, there are available a method for designating a face photo captured by a digital camera or a portable phone and a method for again designating a face image from retrieval results. When no hit is found by means of first retrieval using a face photo, retrieval is again performed by use of retrieval results, or the like, of the candidates 84*a* for the next retrieval. In the first embodiment, the number of candidates 84*a* for the next retrieval is set in step S402 by the retrieval result display section 104. However, the number of candidates can also be set by way of the retrieval screens shown in FIG. 8.

Figure 9:
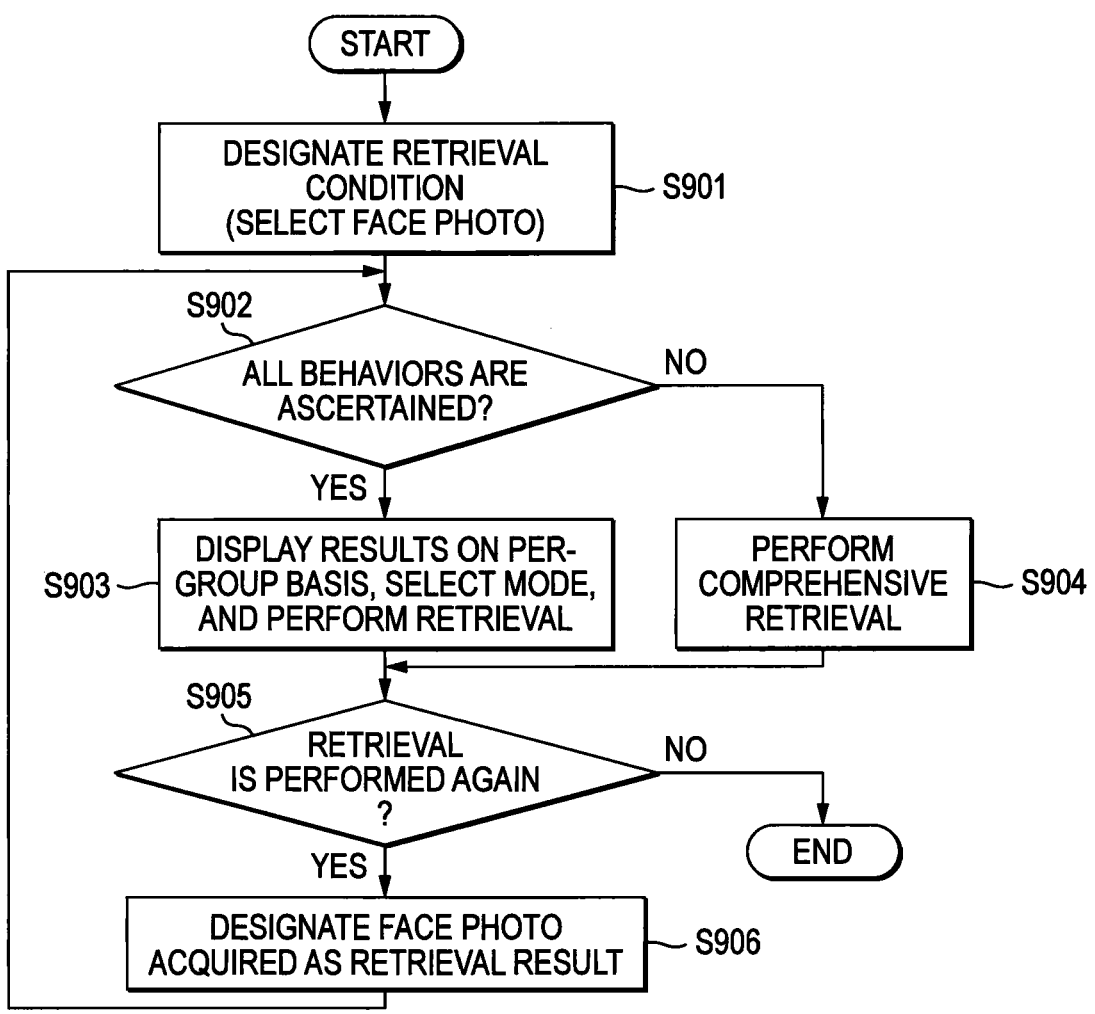
FIG. 9 It is a flowchart showing retrieval operation of the analogous image retrieval result display apparatus of the third embodiment of the present invention.
Figure 10:
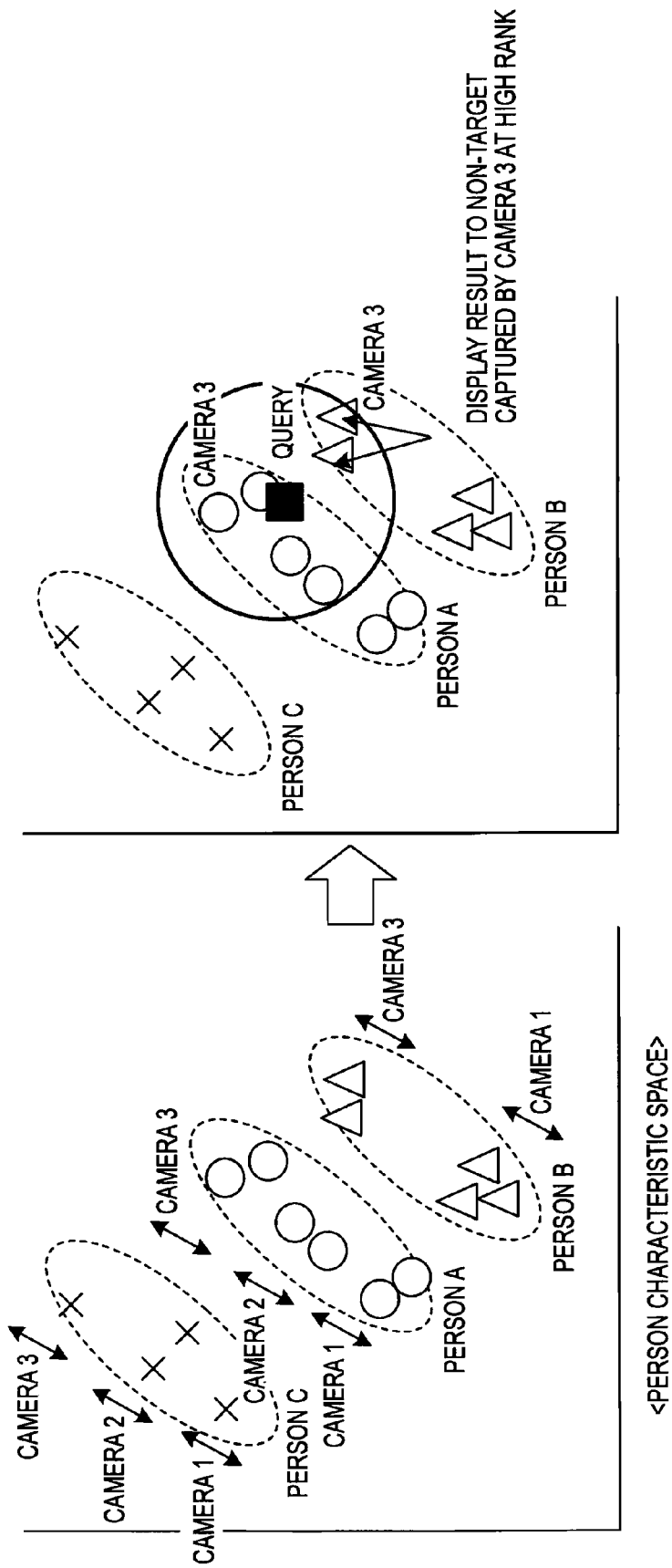
FIG. 10 It is a descriptive view of a person characteristic space for describing a drawback of the related art.

FIG. 9 shows procedures along which the user ascertains the history of all behaviors of a person to be retrieved by use of the retrieval screens shown in FIG. 8. The procedures are now described.

<Step S901> "Date and time/location and a face image" of the retrieval conditions is designated.

<Step S902> Two methods are available as procedures for the user to grasp the history of all behaviors; namely, (1) a method for displaying all retrieval results on a per-group basis (simply ascertaining a list of persons to be retrieved) and subsequently again setting retrieval conditions for each group, thereby performing detailed retrieval of the behavior history and (2) a method for performing detailed retrieval of groups where no hit was found, by use of candidates for the next retrieval while detailed retrieval of a behavior history is concurrently performed. When retrieval is conducted under the former method, processing proceeds to step S903. On the contrary, when retrieval is conducted by means of the latter method, processing proceeds to step S904.

<Step S903> In order to perform retrieval on a per-group basis, the screen shown in FIG. 8<*b*> is selected, and retrieval is conducted.

<Step S904> In order to perform detailed retrieval (comprehensive retrieval) of a behavior history, the screen shown in FIG. 8<*a*> is selected, and retrieval is conducted.

<Step S905> Retrieval results are browsed, and a determination is made as to whether to perform retrieval again. When retrieval is again performed, processing proceed to step S906. When retrieval is not performed again, processing ends.

<Step S906> In the case of the retrieval method (1) described in connection with step S902, detailed retrieval of a behavior history is conducted on a per-group basis. Therefore, typical results of a group of interest are designated as face images for the next retrieval. In the case of the retrieval method (2) described in connection with step S902, it is desired to perform detailed retrieval focused primarily on an imaging environment differing from that of the first retrieval images, face images of candidates for the next retrieval are designated as retrieval conditions, and retrieval is again conducted.

As mentioned above, it is possible to simply, accurately ascertain the history of behaviors of the person to be retrieved by use of the function of listing persons to be retrieved in various camera environments and the function of ascertaining the history of all behaviors of the persons to be retrieved. In particular, as a result of adoption of a display mode for providing a detailed display of results exhibiting high similarity levels and displaying typical results in connection with results exhibiting low similarity levels, the searcher can fulfill retrieval of the history of all behaviors in various camera environments by means of simple switching operation including ascertaining the history of all behaviors from results of high similarity levels and designating and re-retrieving results of low similarity levels, including the person to be retrieved, as conditions for the next retrieval at a point in time when similarity levels are deteriorated (a point in time when other persons are mixedly captured); namely, performing detailed retrieval primarily focused on the imaging environments whose similarity levels are deteriorated.

Although the present invention has been described in detail by reference to the specific embodiments, it is manifest to those skilled in the art that the present invention be susceptible to various alterations and modifications without departing the spirit and scope of the invention.

The present patent application is based on Japanese Patent Application (JP-A-2008-118690) filed on Apr. 30, 2008 in Japan, the entire subject matter of which is incorporated herein by reference.

INDUSTRIAL APPLICABILITY

The present invention yields an advantage of the ability to simply, accurately ascertain the history of all behaviors of a person to be retrieved even in various camera environments (eliminate a phenomenon of no hit of retrieval results being found in specific cameras). In addition to being applied to surveillance for ascertaining all behaviors of a shoplifter, a stray child, a missing luggage, and the like, captured by a plurality of cameras, the present invention can be applied to applications of browsing, retrieving, and editing contents (still images or moving images) personally captured during a trip or a field day.

DESCRIPTIONS OF THE REFERENCE NUMERALS AND SYMBOLS

11 CAMERA
12 PERSON RETRIEVAL SERVER
13 RETRIEVAL TERMINAL
14 PERSON CHARACTERISTIC DATABASE
15 GROUPING HISTORY INFORMATION
101 RETRIEVAL REQUEST RECEIVING SECTION
102 CHARACTERISTIC RETRIEVAL SECTION
103 RETRIEVAL RESULT GROUPING SECTION
104 RETRIEVAL RESULT DISPLAY SECTION

The invention claimed is:

1. An apparatus for displaying a result of analogous image retrieval, comprising:
a server, communicatively coupled to a plurality of cameras and a retrieval terminal, configured to execute computer-executable components, comprising:
a person characteristic database that stores person characteristic data extracted from a plurality of cameras;
a retrieval request receiving section that receives, as a retrieval key, an identifier for identifying a person to be retrieved;
a characteristic retrieval section that retrieves as retrieval results one or more persons from the person characteristic database matching the retrieval key in a descending order of similarity to the retrieval key, the retrieval results corresponding to characteristic data extracted from the plurality of cameras;
a retrieval result grouping section that:
divides the retrieval results on a per-camera basis;
calculates evaluation values for each of the plurality of cameras;
compares the evaluation values for each of the plurality of cameras;
divides cameras with similar evaluation values into groups; and
further classifies the retrieval results divided on a per-camera basis into units corresponding to the groups of cameras with similar evaluation values; and
a retrieval result display section that displays the retrieval results according to the units determined by the retrieval result grouping section.

2. The apparatus according to claim 1, wherein the characteristic retrieval section retrieves the one or more persons from the person characteristic database in the descending order of the similarity on a per-camera basis and combines respective results from respective cameras retrieved on a per-camera basis to generate the retrieval results.

3. An apparatus for displaying a result of analogous image retrieval, comprising:
a server, communicatively coupled to a plurality of cameras and a retrieval terminal, configured to execute computer-executable components, comprising:
a person characteristic database that stores person characteristic data extracted from a plurality of cameras;
a retrieval request receiving section that receives, as a retrieval key, an identifier for identifying a person to be retrieved;
a characteristic retrieval section that retrieves one or more persons matching the retrieval key from the person characteristic database in a descending order of similarity to the retrieval key as retrieval results, the retrieval results corresponding to characteristic data extracted from a subset of the plurality of cameras;
a retrieval result grouping section that classifies the retrieval results, from the characteristic retrieval section, into units based on respective evaluation values corresponding to respective cameras of the subset, each unit includes retrieval results extracted by one or more cameras of the subset having similar respective evaluation values; and
a retrieval result display section that displays the retrieval results according to the units determined by the retrieval result grouping section, wherein the retrieval result grouping section determines evaluation values on a per-camera basis, and wherein an evaluation value for a camera is determined based on a number of retrieval results associated with the camera, a mean value of retrieval ranks, relative to all retrieval results, for retrieval results associated with the camera and a dispersion value of the retrieval ranks.

4. The apparatus according to claim 3, wherein the retrieval result grouping section further determines the cameras corresponding to a unit by use of information about directions of persons included in the retrieval results.

5. The apparatus according to claim 3, wherein the retrieval result grouping section further determines the cameras corresponding to a unit by use of information about sizes of persons included in the retrieval results.

6. The apparatus according to claim 3, wherein the retrieval result grouping section further determines the cameras corresponding to a unit by use of information about contrast density patterns of persons included in the retrieval results.

7. The apparatus according to claim 3, wherein the retrieval result grouping section further determines the cameras corresponding to a unit by use of person detection sensitivity information included in the retrieval results.

8. The apparatus according to claim 3, wherein the retrieval result grouping section further determines the cameras corresponding to a unit by use of date and time information included in the retrieval results.

9. The apparatus according to claim 3, wherein the retrieval result grouping section further determines the cameras corresponding to a unit by use of grouping history information that includes results of grouping operations performed in the past.

10. The apparatus according to claim 1, wherein the retrieval result display section selects at least a threshold number of retrieval results from each group and displays a list of the selected results.

11. The apparatus according to claim 10, wherein the retrieval result display section selects all retrieval results of a group having a similarity exceeding a threshold value and displays a list of the selected results.

12. A method for displaying a result of analogous image retrieval, comprising:
   a person characteristic data storage step of storing person characteristic data extracted from a plurality of cameras into a person characteristic database;
   a retrieval request receiving step of receiving, as a retrieval key, an identifier for identifying a person to be retrieved;
   a characteristic retrieval step of retrieving, as retrieval results, one or more persons from the person characteristic database matching the retrieval key in a descending order of similarity to the retrieval key, the retrieval results corresponding to characteristic data extracted by the plurality of cameras;
   retrieval result grouping steps of:
      dividing the retrieval results on a per-camera basis;
      calculating evaluation values for each of the plurality of cameras;
      comparing the evaluation values for each of the plurality of cameras;
      dividing cameras with similar evaluation values into groups; and
      further classifying the retrieval results divided on a per-camera basis into units corresponding to the groups of cameras with similar evaluation values; and
   a retrieval result display step of displaying the retrieval results according to the units determined in the retrieval result grouping step.

* * * * *